United States Patent
Chen

(10) Patent No.: US 7,533,290 B2
(45) Date of Patent: May 12, 2009

(54) MICROCODE UPDATING ERROR HANDLING APPARATUS AND METHOD THEREOF

(75) Inventor: Hsin-Hung Chen, Hua-Lien Hsien (TW)

(73) Assignee: Realtek Semiconductor Corp., HsinChu (TW)

( * ) Notice: Subject to any disclaimer, the term of this patent is extended or adjusted under 35 U.S.C. 154(b) by 431 days.

(21) Appl. No.: 11/307,775

(22) Filed: Feb. 21, 2006

(65) Prior Publication Data

US 2007/0220372 A1    Sep. 20, 2007

(51) Int. Cl.
*G06F 11/00* (2006.01)
(52) U.S. Cl. .......................................... 714/6; 717/168
(58) Field of Classification Search .............. 714/6; 717/168
See application file for complete search history.

(56) References Cited

U.S. PATENT DOCUMENTS

| | | | |
|---|---|---|---|
| 6,052,347 A * | 4/2000 | Miyata | 369/47.53 |
| 6,170,043 B1 | 1/2001 | Hu | |
| 6,678,741 B1 * | 1/2004 | Northcutt et al. | 709/248 |
| 6,738,876 B2 * | 5/2004 | La | 711/163 |
| 7,197,634 B2 * | 3/2007 | Kruger et al. | 713/1 |
| 7,272,711 B2 * | 9/2007 | Suda et al. | 713/100 |
| 7,293,169 B1 * | 11/2007 | Righi et al. | 713/2 |
| 2002/0092008 A1 * | 7/2002 | Kehne et al. | 717/168 |
| 2003/0156513 A1 * | 8/2003 | Tseng et al. | 369/47.53 |
| 2004/0024917 A1 * | 2/2004 | Kennedy et al. | 710/1 |
| 2004/0062166 A1 * | 4/2004 | Tanimukai et al. | 369/53.37 |
| 2004/0246836 A1 * | 12/2004 | Choi | 369/47.5 |
| 2006/0075284 A1 * | 4/2006 | Skan | 714/5 |

\* cited by examiner

*Primary Examiner*—Emerson C Puente
(74) *Attorney, Agent, or Firm*—Winston Hsu

(57) ABSTRACT

A method of microcode updating error handling for an electronic device is disclosed. The method includes: providing a status flag to indicate if updating a renewable part of a microcode is complete, wherein the microcode comprises a non-renewable part having an updating error handling code; and detecting the status flag, and if the status flag corresponds to a first status, utilizing the updating error handling code for completing a boot-up procedure.

28 Claims, 3 Drawing Sheets

MICROCODE UPDATING ERROR HANDLING APPARATUS AND METHOD THEREOF

BACKGROUND OF THE INVENTION

1. Field of the Invention

The present invention relates generally to microcode updating error handling, and more particularly, to microcode updating either after an incomplete or complete microcode updating procedure.

2. Description of the Prior Art

The prior art method of a microcode update is susceptible to unrecoverable error conditions. As an example, consider the traditional optical disc drive, such as a CD-ROM drive. The CD-ROM drive is often utilized in a Windows computing environment within a typical computer, such as a personal computer, or some similar devices. Periodically the user of such a CD-ROM drive may desire to upgrade the microcode (firmware) that is stored within the CD-ROM drive. Please note that microcode is also commonly referred to as firmware. Microcode is commonly considered a permanent memory that holds the elementary control operations that a computer or other device, such as a CD-ROM drive, must perform for each instruction in its instruction set. The microcode functions as a translation layer between the instructions that, for example, the CD-ROM drive executes, and the electronic level of the computer. The microcode enables the computer architect to add new types of machine instructions more easily without necessitating a redesign of the electronic circuit. It is advantageous for the user to upgrade the microcode that resides within their devices. In this example, it benefits the user to upgrade the microcode of the CD-ROM drive, however, there is risk involved during the microcode upgrade process. For example, a sudden loss of electrical power occurring simultaneously as the microcode of the CD-ROM is being updated, will cause the upgrade flow control program of the conventional prior art device, including for example the CD-ROM drive, to be lost thereby unintentionally and abruptly ending the updating process. It is a disadvantage of the conventional CD-ROM drive that the microcode update flow control program is executed in volatile memory, such as SDRAM, therefore a power loss will cause the SDRAM to lose its contents. In other words, the microcode of the CD-ROM drive becomes incomplete in the event of a sudden power loss and the microcode update flow control program of the original microcode is lost due to the unexpected updating interruption. This is especially precarious because the failed microcode update for the CD-ROM drive will prevent the desired microcode from being re-written into the CD-ROM drive for replacing the currently used incomplete microcode. In this example, an unpredictable interruption of the microcode updating process of the conventional CD-ROM drive of a typical Windows computer results in the CD-ROM drive having unusable and corrupted microcode, and the Windows computer being unusable and unable to boot-up, access the CD-ROM drive, or load the Windows environment (i.e., the Windows operating system). This is obviously a tremendous inconvenience to the user. In addition, the user will often delay or avoid entirely a microcode upgrade/update even when said upgrade/update has been recommended for installation by the appropriate manufacturer or vendor. This practice is a result of users experiencing failed microcode upgrades/updates that have rendered their devices, the CD-ROM drive, computer, or other device, unusable. Microcode upgrades and updates that are otherwise critical to the correct operation of the particular device are purposely ignored.

Therefore, it is apparent that improved microcode update processes and devices are needed wherein said devices and processes are not affected by error events such as a sudden loss of electrical power or the unexpected rebooting of the computer's Windows environment (i.e., the Windows operating system) during a microcode updating process.

SUMMARY OF THE INVENTION

It is therefore one objective of the claimed invention to provide an electronic device and related method of microcode update error handling for the electronic device, to solve the above-mentioned problem.

A method of microcode updating error handling for an electronic device is disclosed. According to one embodiment of the claimed invention, the method comprises: providing a status flag to indicate if updating a renewable part of a microcode is complete, wherein the microcode comprises a non-renewable part having an updating error handling code; and detecting the status flag, and if the status flag corresponds to a first status, utilizing the updating error handling code for completing the boot-up procedure.

A microcode updating error handling for an electronic device method is further disclosed. According to one embodiment of the claimed invention, the method comprise: providing a status flag to indicate if updating a renewable part of a microcode is complete, wherein the microcode comprises a non-renewable part having an updating error handling code; detecting the status flag, and if the status flag corresponds to a first status, utilizing the updating error handling code for updating the renewable part of the microcode; controlling the status flag to correspond to a second status after updating the renewable part of the microcode is completed.

An electronic device with microcode updating error handling is further disclosed. According to one embodiment of the claimed invention, the electronic device comprises: a first memory unit for storing a status flag, wherein the status flag indicates if updating a renewable part of a microcode is complete; a second memory unit for storing the microcode, wherein the microcode comprises a non-renewable part having an updating error handling code; a flag control unit, coupled to the first memory unit, for detecting the status flag; a processing unit, coupled to the second memory unit, for running a boot-up procedure; wherein if the detecting unit detects that the status flag corresponds to a first status, the processing unit utilizes the updating error handling code for completing the boot-up procedure.

An electronic device with microcode updating error handling is further disclosed. According to one embodiment of the claimed invention, the electronic device comprises: a first memory unit for storing a status flag, wherein the status flag indicates if updating a renewable part of a microcode is complete; a second memory unit for storing the microcode, wherein the microcode comprises a non-renewable part having an updating error handling code; a flag control unit, coupled to the first memory unit, for detecting the status flag; and a processing unit, coupled to the second memory unit, for utilizing the updating error handling code to update the renewable part of the microcode if the flag control unit detects that the status flag corresponds to a first status; wherein the status control unit controls the status flag to correspond to a second status after updating the renewable part of the microcode is completed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
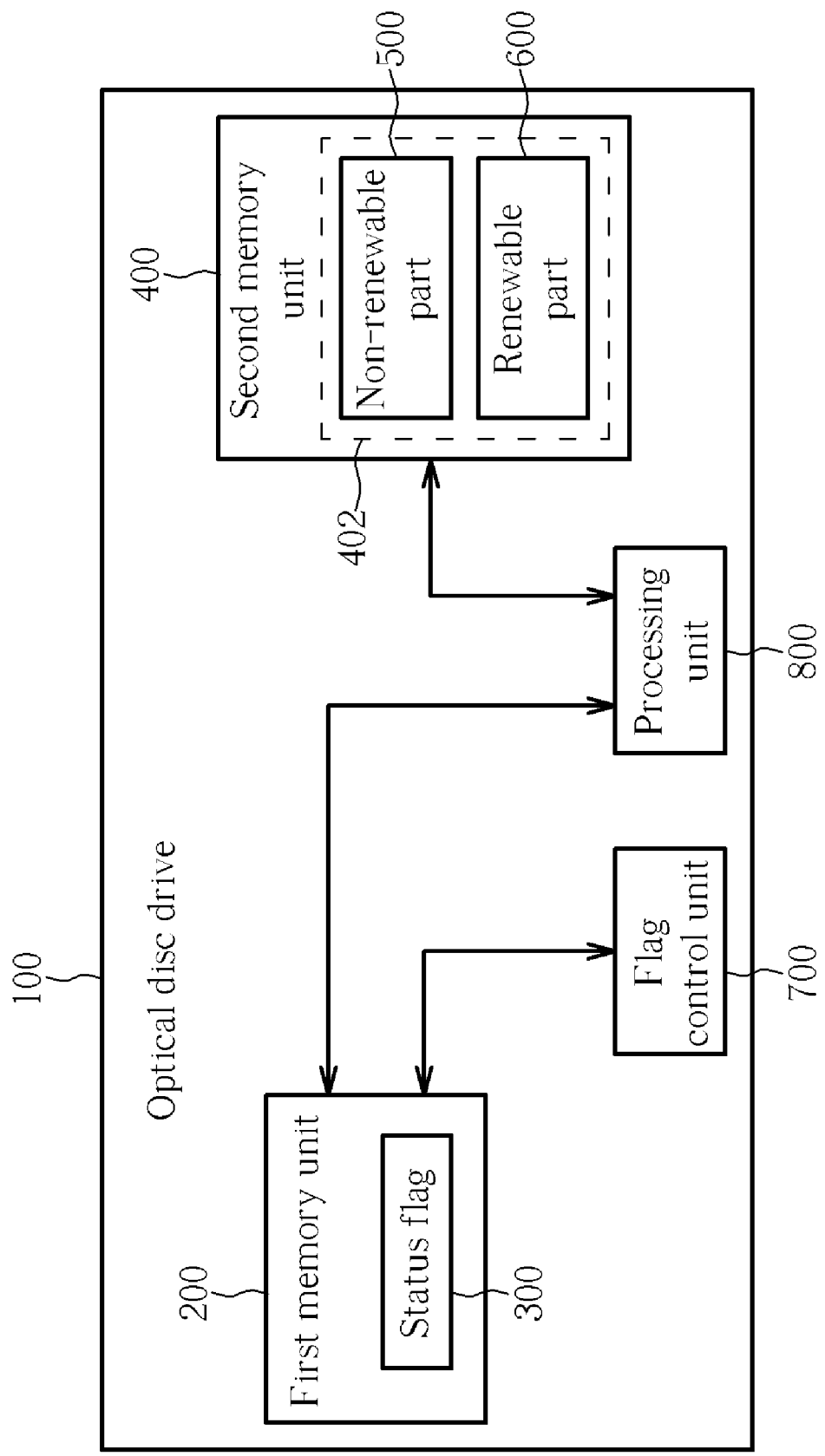
FIG. 1 is a block diagram of an electronic device with microcode updating error handling features according to an exemplary embodiment of the present invention.

Please refer to FIG. 1. FIG. 1 is a block diagram of an electronic device with microcode updating error handling features according to an exemplary embodiment of the present invention. In this embodiment, the optical disc drive 100 acts as an example for illustrating the microcode updating error handling scheme of the present invention. However, the microcode updating error handling scheme is not limited to be applied to optical disc drives, such as CD-ROM drives, CD+R/RW drives, DVD-ROM drives, DVD+R/RW drives, DVD-R/RW drives, or other types of storage devices. As shown in FIG. 1, the optical disc drive 100 includes a first memory unit 200 for storing a status flag 300 used to indicate if updating a microcode is complete or incomplete. A second memory unit 400 is utilized for storing a microcode 402 comprising two parts, a non-renewable part 500 and a renewable part 600. Please note that in this embodiment the microcode 402 can be firmware. A flag control unit 700 is coupled to the first memory unit 200, for detecting the status flag word 300 when the optical disc drive 100 is powered on. A processing unit 800 is coupled to the second memory unit 400. Additionally, the processing unit 800 is coupled to the first memory unit 200 for detecting the flag word held by the status flag 300.

Several modifications to the design particulars of the optical disc drive 100 are possible and should be well known to one skilled in the art. Therefore, details are omitted for the sake of brevity. It is possible based on the design requirements, that the first memory unit 200, in which the status flag 300 is disposed, be incorporated into a single memory along with the second memory unit 400, in which the non-renewable part 500 and the renewable part 600 are disposed. That is, both the status flag 300 and microcode are stored in a non-volatile memory such as a Flash ROM or an EEPROM. For example, the status flag 300 can be stored in the non-volatile memory in an optimum power calibration (OPC) values sector or a region playback control (RPC) values sector thereof. It is also possible to incorporate the flag control unit 700 with the processing unit 800 to form a single unit capable of performing the same functions. That is, the flag control unit 700 could be implemented by hardware or software. Many additional configuration changes are possible that also obey the spirit of the present invention for microcode updating error handling.

Figure 2:
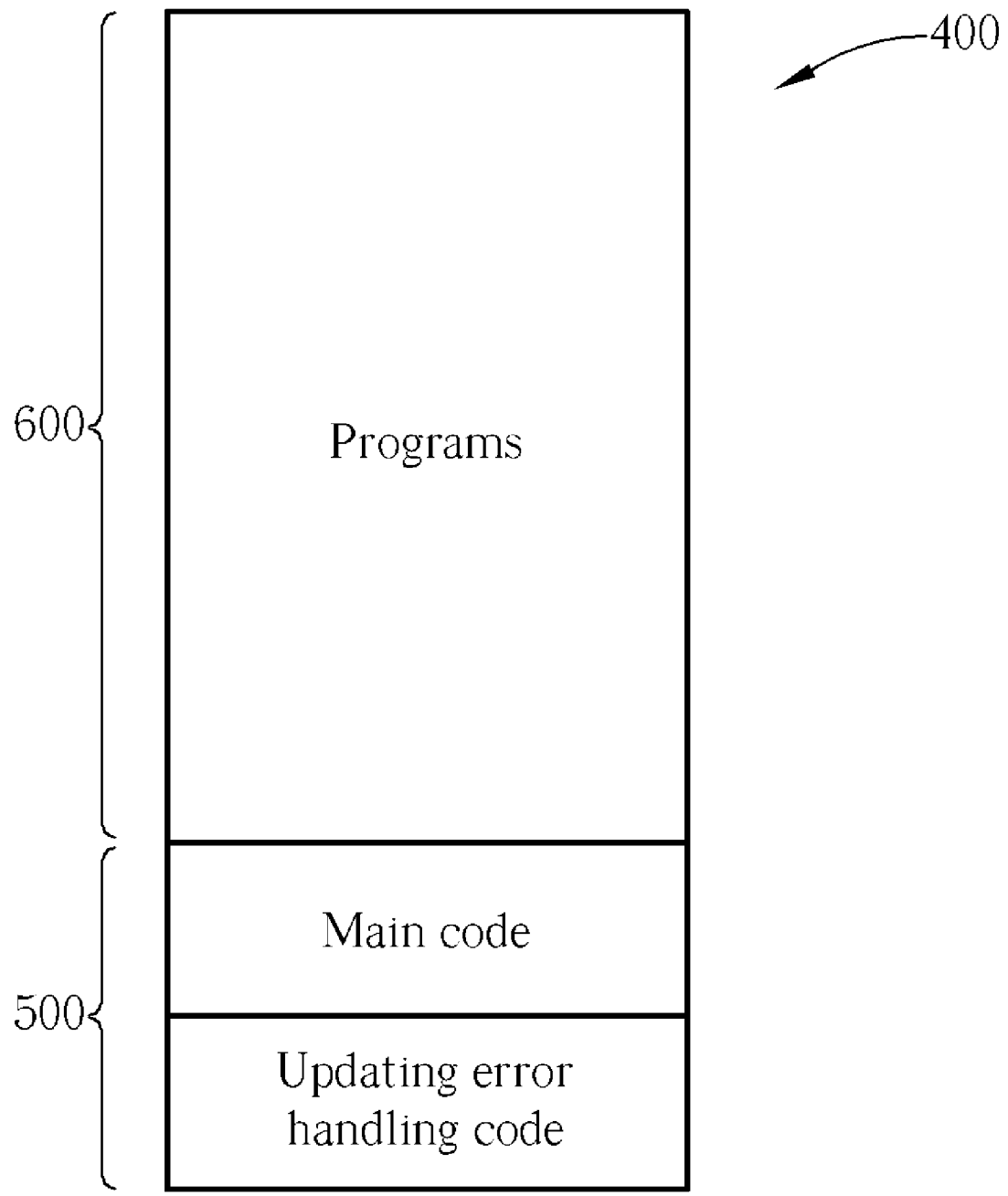
FIG. 2 is a simplified diagram showing the data structure within the second memory unit shown in FIG. 1.

Please refer to FIG. 2 for a simplified diagram showing the data structure within the second memory unit 400 shown in FIG. 1. The renewable part 600 includes programs that are allowed to be updated, while the non-renewable part 500 includes a main code and an updating error handling code that are prohibited from being changed. The main code is used for initializing hardware settings of the optical disc drive 100 and controlling a boot-up procedure after powering on the optical disc drive 100. In other words, the main code is the first part within the microcode 402 to be loaded and executed by the processing unit 800 after powering on the optical disc drive 100. Please note that, in contrast to the prior art microcode data structure, the main code or the updating error handling code of the microcode 402 are not intended for updating or modifications. However, under certain circumstances when upgrading is necessary, special commands and procedures associated with a burner can be used to modify the main core, which includes the main code and the updating error handling code. The updating error handling code is executed if the programs are not successfully updated during a previous microcode update.

The updating error handling scheme is detailed as follows.

Figure 3:
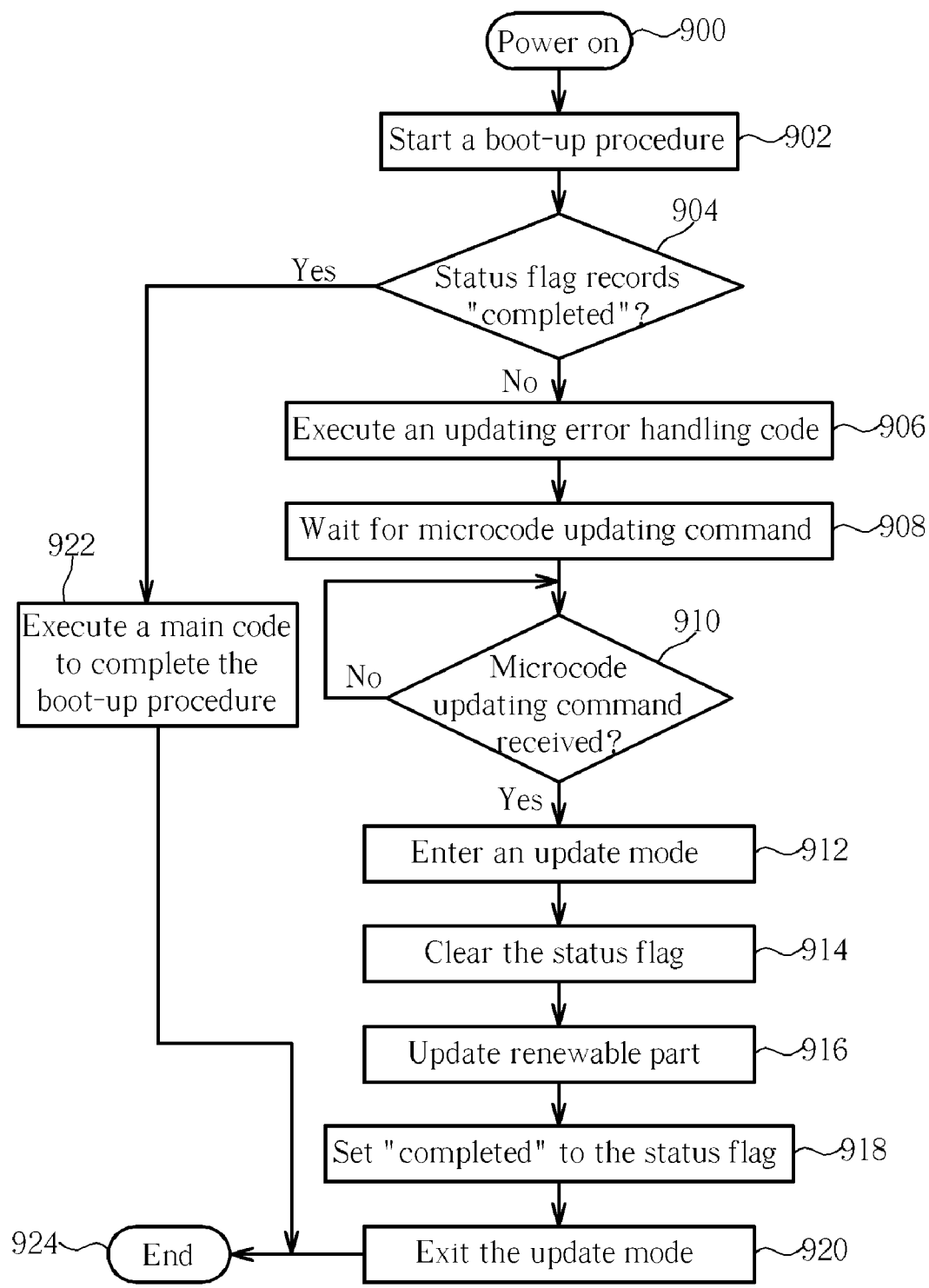
FIG. 3 shows the control flow for microcode updating according to an embodiment of the present invention.

Please refer to FIG. 3. FIG. 3 shows the control flow for microcode updating according to an embodiment of the present invention. In this embodiment, the status flag 300 records "completed" when the programs are successfully updated. The control flow includes following steps.

Step 900: Power on the optical disc drive 100.

Step 902: The processing unit 800 executes the main code stored in the second memory unit 400 to start a boot-up procedure.

Step 904: The flag control unit 700 checks if the flag word recorded by the status flag 300 is "completed". If yes, go to step 922; otherwise, go to step 906.

Step 906: The processing unit 800 executes the updating error handling code stored in the second memory to complete the boot-up procedure for allowing a start-up of the Windows environment;

Step 908: After the Windows environment is ready, the optical disc drive 100 waits for a microcode updating command from a host.

Step 910: Is the microcode updating command received? If yes, go to step 912; otherwise, repeat step 910.

Step 912: The processing unit 800 executes the updating error handling code to make the optical disc drive 100 enter an update mode.

Step 914: The flag control unit 700 clears the status flag 300.

Step 916: The processing unit 800 executes the updating error handling code to update the current programs (renewable part 500) by new programs.

Step 918: After the renewable part 500 is completely updated, the flag control unit 700 sets a flag word "completed" to the status flag 300.

Step 920: The processing unit 800 stops executing the updating error handling code to make the optical disc drive 100 exit the update mode. Go to step 924.

Step 922: The processing unit 800 executes the main code to complete the boot-up procedure.

Step 924: End.

As detailed in the above-described flow, the main code, like the prior art main code, is responsible for the boot-up procedure of the optical disc drive 100. However, if the status flag 300 does not hold "completed," then the updating error handling scheme of the present invention is activated because the status flag 300 indicates the programs (renewable part 600) were not correctly updated in a previous microcode update. If the running main code calls the erroneous programs, the boot-up procedure might fail thereby affecting the boot-up process of the entire computer system. In this embodiment, the processing unit 800 executes the main code to call the updating error handling code, and then executes the updating error handling code to take over responsibility for the boot-up control of the optical disc drive 100, allowing the start-up of Windows environment. Then, since the computer system is capable of entering the Windows environment with the help of the updating error handling code, the user can restart a microcode update to update the renewable part 600 of the microcode 402. In this embodiment, after receiving the microcode updating command from a host, the processing unit 800 executes the updating error handling code, acting as a prior art microcode updater, to write new programs into the second memory unit 400 for updating the renewable part 600 as desired. If the optical disc drive 100 is affected by a sudden loss of electrical power during the execution of step 916, then the status flag 300 will still retain the initial status information which means the status flag 300 will contain the value "completed". Therefore, after the optical disc drive 100 is rebooted, the same flow shown in FIG. 3 is restarted, to achieve the objective of trying to complete updating of the renewable part 600 of the microcode 402.

Please note that step 914 is optional depending on design requirements. Step 914 in the above-described flow is used to ensure that the status flag 300 will not unexpectedly hold "completed" before the renewable part 500 is successfully updated. As to clearing the status flag 300, a fixed pattern different from "completed" can be used. For example, a flag word "incomplete" is set to the status flag 300, or the status flag 300 are filled with a series of 0's. As mentioned above, the flag control unit 700 can be implemented by hardware or software. In one preferred embodiment of the present invention, the main code executed by the processing unit 800 is utilized to act as the flag control unit 700 such that the hardware cost is reduced. In the above flow, the microcode updating is performed in a Windows environment. However, the present invention is not limited to a Windows environment. That is, the updating error handling scheme of the present invention can be applied to all kinds of microcode updating modes.

The status flag 300 can be stored in any non-volatile memory, such as a Flash ROM or an EEPROM. By way of example, and not limitation, the physical position of the main code and the updating error handling code is in the Flash ROM, however, any non-volatile storage such as EEPROM is compatible with the present invention. In addition, the data structure shown in FIG. 2 is only for illustrative purposes. In practical applications, physical addresses of the main code and the updating error handling code in the second memory unit 400 are programmable. The updating error handling code, therefore, is not limited to be stored adjacent to the main code.

The present invention offers several advantages over the prior art microcode upgrading process. The present invention maintains a working and accessible device, such as a computer or an optical disc drive, even after an unpredictable problem like a sudden power loss or an unexpected restart of the Windows environment (i.e., the Windows operating system). The present invention provides for the user being able to continue with the upgrading process of the microcode regardless of these external events. Additionally, the present invention is cost efficient over the prior art because it utilizes less SRAM or SDRAM to store the programs required by the microcode updating process. The Flash ROM stores the non-renewable main code and updating error handling code serving as a microcode updater. A second cost savings feature is the elimination of hardware used for loading the programs into the SRAM/SDRAM. By checking the status flag, the present invention ensures that the correct microcode program codes are executed after the start-up of the computer (e.g., the Windows environment computer). Finally, it is possible to program the location of the renewable part of the microcode according to the type of Flash ROM that is utilized and the requirements of the particular system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of microcode updating error handling for an electronic device being installed in a host system, the method comprising:
   providing a status flag to indicate if a previous update of a renewable part of a microcode of the electronic device was successfully completed, wherein the microcode also includes a non-renewable part having an updating error handling code;
   detecting the status flag during a boot-up procedure of the electronic device; and
   when the status flag corresponds to a first status indicating that the previous update of the renewable part of the microcode was not successfully completed, utilizing the updating error handling code for completing the boot-up procedure of the electronic device and for detecting a microcode update command from the host system to update the renewable part of the microcode of the electronic device.

2. The method of claim 1, further comprising:
   updating the renewable part of the microcode after the boot-up procedure is completed according to the microcode update command from the host system; and
   controlling the status flag to correspond to a second status after the updating of the renewable part of the microcode is successfully completed;
   wherein the second status is for indicating that the renewable part of the microcode of the electronic device was successfully updated.

3. The method of claim 2, wherein the non-renewable part of the microcode further includes a main code, the method further comprising utilizing the main code for completing the boot-up procedure of the electronic device when the status flag corresponds to the second status.

4. The method of claim 1, wherein the updating error handling code is further for allowing a start-up of an operating system of the host system.

5. The method of claim 1, wherein detecting the status flag further comprises:
   accessing a non-volatile memory for checking the status flag, wherein the microcode is stored in the non-volatile memory.

6. The method of claim 5, wherein the status flag is stored in an optimum power calibration (OPC) values sector of the non-volatile memory.

7. The method of claim 5, wherein the status flag is stored in a region playback control (RPC) values sector of the non-volatile memory.

8. A method of microcode updating error handling for an electronic device being installed in a host system, the method comprising:
   providing a status flag to indicate if a previous update of a renewable part of a microcode of the electronic device was successfully completed, wherein the microcode also includes a non-renewable part having an updating error handling code;
   detecting the status flag during a boot-up procedure of the electronic device; and when the status flag corresponds to a first status indicating that the previous update of the renewable part of the microcode was not successfully completed, utilizing the updating error handling code for updating the renewable part of the microcode according to a microcode update command from the host system; and controlling the status flag to correspond to a second status after the updating of the renewable part of the microcode is successfully completed;

wherein the second status is for indicating that the renewable part of the microcode of the electronic device was successfully updated.

9. The method of claim 8, wherein the non-renewable part of the microcode further includes a main code, the method further comprising:

utilizing the main code for completing the boot-up procedure of the electronic device when the status flag corresponds to the second status.

10. The method of claim 8, wherein the updating error handling code is further for allowing a start-up of an operating system of the host system.

11. The method of claim 8, wherein detecting the status flag further comprises:

accessing a non-volatile memory for checking the status flag, wherein the microcode is stored in the non-volatile memory.

12. The method of claim 11, wherein the status flag is stored in an optimum power calibration (OPC) values sector of the non-volatile memory.

13. The method of claim 11, wherein the status flag is stored in a region playback control (RPC) values sector of the non-volatile memory.

14. An electronic device being installed in a host system, the electronic device comprising:

a first memory unit for storing a status flag, wherein the status flag indicates if a previous update of a renewable part of a microcode of the electronic device was successfully completed;

a second memory unit for storing the microcode, wherein the microcode also includes a non-renewable part having an updating error handling code;

a flag control unit, coupled to the first memory unit, for detecting the status flag during a boot-up procedure of the electronic device; and a processing unit, coupled to the second memory unit, for running the boot-up procedure;

wherein when the detecting unit detects that the status flag corresponds to a first status indicating that the previous update of the renewable part of the microcode was not successfully completed, the processing unit utilizes the updating error handling code for completing the boot-up procedure and for detecting a microcode update command from the host system to update the renewable part of the microcode.

15. The electronic device of claim 14, wherein after the boot-up procedure is completed, the processing unit utilizes the error handling code for updating the renewable part of the microcode according to the microcode update command from the host system; and after the updating of the renewable part of the microcode is successfully completed, the flag control unit controls the status flag to correspond to a second status; the second status for indicating that the renewable part of the microcode was successfully updated.

16. The electronic device of claim 15, wherein the non-renewable part of the microcode further includes a main code, and when the flag control unit detects that the status flag corresponds to the second status, the processing unit utilizes the main code for completing the boot-up procedure.

17. The electronic device of claim 14, wherein the processing unit is further for utilizing the updating error handling code for allowing a start-up of an operating system of the host system.

18. The electronic device of claim 14, wherein both the first and second memory units are positioned in a same non-volatile memory.

19. The electronic device of claim 18, wherein the status flag is stored in an optimum power calibration (OPC) values sector of the non-volatile memory.

20. The electronic device of claim 18, wherein the status flag is stored in a region playback control (RPC) values sector of the non-volatile memory.

21. The electronic device of claim 14, being an optical disc drive.

22. An electronic device being installed in a host system, the electronic device comprising:

a first memory unit for storing a status flag, wherein the status flag indicates if a previous update of a renewable part of a microcode of the electronic device was successfully completed;

a second memory unit for storing the microcode, wherein the microcode also includes a non-renewable part having an updating error handling code;

a flag control unit, coupled to the first memory unit, for detecting the status flag during a boot-up procedure of the electronic device; and a processing unit, coupled to the second memory unit, for utilizing the updating error handling code to update the renewable part of the microcode according to a microcode update command from the host system when the flag control unit detects that the status flag corresponds to a first status indicating that the previous update of the renewable part of the microcode was not successfully completed;

wherein the status control unit controls the status flag to correspond to a second status after the updating of the renewable part of the microcode is successfully completed; and the second status is for indicating that the renewable part of the microcode of the electronic device was successfully updated.

23. The electronic device of claim 22, wherein the non-renewable part of the microcode further includes a main code, and when the flag control unit detects that the status flag corresponds to the second status, the processing unit utilizes the main code for completing the boot-up procedure.

24. The electronic device of claim 22, wherein the processing unit is further for utilizing the updating error handling code for allowing a start-up of an operating system of the host system.

25. The electronic device of claim 22, wherein both the first and second memory units are positioned in a same non-volatile memory.

26. The electronic device of claim 25, wherein the status flag is stored in an open connectivity standard (OPC) sector of the non-volatile memory.

27. The electronic device of claim 25, wherein the status flag is stored in a region playback control (RPC) values sector of the non-volatile memory.

28. The electronic device of claim 22, being an optical disc drive.

* * * * *